United States Patent
Gustafsson et al.

(10) Patent No.: US 12,401,712 B2
(45) Date of Patent: Aug. 26, 2025

(54) PROVIDING DATA STREAMS TO A CONSUMING CLIENT

(71) Applicant: Telefonaktiebolaget LM Ericsson (PUBL), Stockholm (SE)

(72) Inventors: Harald Gustafsson, Lund (SE); Ola Angelsmark, Ystad (SE); Sambit Nayak, Orissa (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/772,027

(22) PCT Filed: Oct. 28, 2019

(86) PCT No.: PCT/EP2019/079397
§ 371 (c)(1),
(2) Date: Apr. 26, 2022

(87) PCT Pub. No.: WO2021/083481
PCT Pub. Date: May 6, 2021

(65) Prior Publication Data
US 2022/0377134 A1    Nov. 24, 2022

(51) Int. Cl.
*H04L 67/10* (2022.01)
*G06F 9/54* (2006.01)
*G06F 16/2455* (2019.01)

(52) U.S. Cl.
CPC ............ *H04L 67/10* (2013.01); *G06F 9/546* (2013.01); *G06F 16/24568* (2019.01)

(58) Field of Classification Search
CPC ..... H04L 67/10; H04L 65/612; H04L 65/613; H04L 67/12; G06F 16/24568;
(Continued)

(56) References Cited

U.S. PATENT DOCUMENTS 6,298,455 B1 *  10/2001  Knapman ............... G06F 16/93
                                                         707/999.01
8,321,390 B2 *  11/2012  Swarnakar ........... G06F 16/284
                                                         707/696
(Continued)

FOREIGN PATENT DOCUMENTS

EP    3 128 447 A1    2/2017

OTHER PUBLICATIONS

PCT International Search Report issued for International application No. PCT/EP2019/079397—Jan. 30, 2020.
(Continued)

*Primary Examiner* — Muhammad Raza
(74) *Attorney, Agent, or Firm* — Baker Botts L.L.P.

(57) ABSTRACT

A method for providing data streams to a consuming client over a network interface wherein the data streams comprise message data streams based on streaming nodes indicative of message topics configured for storing and streaming message data, wherein each of the streaming nodes represents a data source device, and wherein interconnections between the streaming nodes define relationships between the streaming nodes is disclosed. The method comprises, by a routing component; receiving (101), from a consuming client, a request comprising a query for a set of streaming nodes and corresponding data, wherein each streaming node of the set of streaming nodes is associated with each other via one or more interconnections in the set of streaming nodes, obtaining (104) a container comprising the set of streaming nodes and corresponding data from a database based on the query of the received request, wherein the corresponding data comprises at least one message stored in a streaming node of the set of streaming nodes, deriving (105) correlated data based on the obtained container, and providing (107), to the consuming client, the set of streaming nodes and the derived correlated data in message data
(Continued)

streams. Corresponding computer program product, arrangement, routing component, and system are also disclosed.

17 Claims, 5 Drawing Sheets

(58) Field of Classification Search
CPC .... G06F 9/546; G06F 2209/547; G06F 9/542; G06F 16/9024; G06F 16/24578
See application file for complete search history.

(56) References Cited

U.S. PATENT DOCUMENTS

| | | | | |
|---|---|---|---|---|
| 2004/0103091 A1* | 5/2004 | Lindblad | ................ | G06F 16/83 |
| | | | | 707/E17.127 |
| 2004/0103105 A1* | 5/2004 | Lindblad | ................ | G06F 16/83 |
| | | | | 707/E17.127 |
| 2005/0138160 A1* | 6/2005 | Klein | ...................... | H04L 41/22 |
| | | | | 715/248 |
| 2006/0122971 A1* | 6/2006 | Berg | ..................... | G06F 9/4493 |
| 2007/0271242 A1* | 11/2007 | Lindblad | ........... | G06F 16/24526 |
| | | | | 707/E17.127 |
| 2008/0010256 A1* | 1/2008 | Lindblad | ................ | G06F 16/81 |
| 2010/0114629 A1 | 5/2010 | Adler et al. | | |
| 2014/0143282 A1* | 5/2014 | Soundararajan | ........ | G06F 16/00 |
| | | | | 707/802 |
| 2015/0019553 A1 | 1/2015 | Shaashua et al. | | |
| 2015/0381557 A1* | 12/2015 | Fan | ......................... | H04L 61/10 |
| | | | | 709/245 |
| 2016/0283589 A1* | 9/2016 | Bostick | .................. | G06Q 50/01 |
| 2017/0161282 A1* | 6/2017 | Kemme | .................. | G06F 9/542 |
| 2018/0025307 A1 | 1/2018 | Hui et al. | | |
| 2018/0089383 A1* | 3/2018 | Allen | ..................... | G16H 15/00 |
| 2018/0167476 A1 | 6/2018 | Hoffner et al. | | |
| 2019/0036804 A1 | 1/2019 | Mihelic et al. | | |
| 2019/0087480 A1* | 3/2019 | Palanciuc | .......... | G06Q 30/0269 |
| 2019/0121979 A1 | 4/2019 | Chari et al. | | |
| 2019/0208032 A1* | 7/2019 | Sivasubramanian | ....................... | |
| | | | | H04L 1/1614 |
| 2019/0236194 A1* | 8/2019 | James | ............... | G06F 16/24542 |
| 2019/0279281 A1* | 9/2019 | Kumar | ............... | G06Q 30/0631 |
| 2020/0394455 A1* | 12/2020 | Lee | ......................... | G06N 20/00 |

OTHER PUBLICATIONS

Sansrimahachai et al., Stream Ancestor Function: A Mechanism for Fine-Grained Provenance in Stream Processing Systems (IEEE)—2011.

PCT Written Opinion of the International Searching Authority issued for International application No. PCT/EP2019/079397—Jan. 30, 2020.

Non-Final Office Action issued by the USPTO for U.S. Appl. No. 17/772,044—Jan. 31, 2024.

* cited by examiner

PROVIDING DATA STREAMS TO A CONSUMING CLIENT

PRIORITY

This nonprovisional application is a U.S. National Stage Filing under 35 U.S.C. § 371 of International Patent Application Serial No. PCT/EP2019/079397 filed Oct. 28, 2019 and entitled "PROVIDING DATA STREAMS TO A CONSUMING CLIENT" which is hereby incorporated by reference in its entirety.

TECHNICAL FIELD

The present disclosure relates generally to the field of data streams. More particularly, it relates to providing data streams to a consuming client over a network interface.

BACKGROUND

Data is more and more consumed via streaming and/or in real-time to allow processing as soon as possible to derive e.g. knowledge.

Such data may be arranged in streams which may each have multiple producers and/or consumers of individual topics.

A first drawback of known data streaming is that advanced and non-efficient routing components are required for processing individual topics of data streams.

A second drawback of known data streaming is that the queries for generating the data stream are difficult to construct.

Therefore, there is a need for alternative approaches for providing data streams to a consuming client over a network interface.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other drawbacks.

According to a first aspect, this is achieved by a method for providing data streams to a consuming client over a network interface wherein the data streams comprise message data streams based on streaming nodes indicative of message topics configured for storing and streaming message data, wherein each of the streaming nodes represents a data source device, and wherein interconnections between the streaming nodes define relationships between the streaming nodes.

The method comprises steps being performed by a routing component.

The method comprises receiving, from a consuming client, a request comprising a query for a set of streaming nodes and corresponding data, wherein each streaming node of the set of streaming nodes is associated with each other via one or more interconnections in the set of streaming nodes, and obtaining a container comprising the set of streaming nodes and corresponding data from a database based on the query of the received request, wherein the corresponding data comprises at least one message stored in a streaming node of the set of streaming nodes.

The method further comprises deriving correlated data based on the obtained container, and providing, to the consuming client, the set of streaming nodes and the derived correlated data in message data streams.

In some embodiments, the method further comprises repeating the obtaining the container, the deriving the correlated data, and the providing the set of streaming nodes and the derived correlated data so that data streams are provided to the consuming client.

In some embodiments, the at least one message comprises a time-series of messages stored in one streaming node of the set of streaming nodes or a plurality of time-series messages stored in a plurality of streaming nodes of the set of streaming nodes.

In some embodiments, the message topics for the message data streams are selected based on interconnection attributes.

In some embodiments, the query is indicative of one or more message data identifiers for messages, or segments of messages in a time-series of messages, for which data streams should be provided.

In some embodiments, the query is further indicative of a time interval criterion for identifying a time interval for which the message data streams should be provided.

In some embodiments, the query is further indicative of a continuation criterion for determining whether to continue obtaining set of streaming nodes and corresponding data, deriving correlated data, and providing message data streams for as long as there is new corresponding data in the streaming node of the set of streaming nodes.

In some embodiments, the consuming client subscribes to message data streams and is provided with new message data streams when new corresponding data is available in the streaming node of the set of streaming nodes.

In some embodiments, the set of streaming nodes comprises a sub-graph of a graph structure.

In some embodiments, the graph structure is a graph database.

In some embodiments, deriving correlated data comprises copying message data or referencing individual or ranges of message data for later look-up.

In some embodiments, the method further comprises notifying, by the routing component, the consuming client that the requested message data streams are available for provision.

In some embodiments, generating, by the routing component, a request identifier for the received request, and providing, by the routing component, the generated request identifier to the consuming client for identification of the requested message data streams when provided to the consuming client.

In some embodiments, the method comprises receiving a plurality of requests from a plurality of consuming clients and providing corresponding message data streams and wherein each of the plurality of requests and the corresponding message data streams are identifiable by the per request generated request identifier.

In some embodiments, the routing component comprises a plurality of sub-components each acting as a separate routing component.

In some embodiments, the routing component is a message broker.

In some embodiments, the message data comprises any one of: provenance information, sensor readings, actuations, log statements, events, commands, and communication messages.

In some embodiments, the set of streaming nodes and interconnections comprise any one of: provenance, absolute or relative location, names, identities, and classes.

In some embodiments, the data streams provided to the consuming client over the network interface relate to any one of: industrial robotics, sensors in a building, and production machines.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an arrangement for a routing component, wherein the routing component is configured for providing data streams to a consuming client over a network interface wherein the data streams comprise message data streams based on streaming nodes indicative of message topics configured for storing and streaming message data, wherein each of the streaming nodes represents a data source device, and wherein interconnections between the streaming nodes define relationships between the streaming nodes.

The arrangement comprises a controller configured to cause reception, from a consuming client, of a request comprising a query for a set of streaming nodes and corresponding data, wherein each streaming node of the set of streaming nodes is associated with each other via one or more interconnections in the set of streaming nodes, and obtainment of a container comprising the set of streaming nodes and corresponding data from a database based on the query of the received request, wherein the corresponding data comprises at least one message stored in a streaming node of the set of streaming nodes.

The controller is further configured to cause derivation of correlated data based on the obtained container, and provision, to the consuming client, of the set of streaming nodes and the derived correlated data in message data streams.

In some embodiments, the controller is further configured to cause repetition of the obtainment of the container, the derivation of the correlated data, and the provision of the set of streaming nodes and the derived correlated data so that data streams are provided to the consuming client.

In some embodiments, the at least one message comprises a time-series of messages stored in one streaming node of the set of streaming nodes or a plurality of time-series messages stored in a plurality of streaming nodes of the set of streaming nodes.

In some embodiments, the message topics for the message data streams are selected based on interconnection attributes.

In some embodiments, the query is indicative of message data identifiers for messages, or segments of messages in a time-series of messages, for which data streams should be provided.

In some embodiments, the query is further indicative of a time interval criterion for identifying a time interval for which the message data streams should be provided.

In some embodiments, the query is further indicative of a continuation criterion for determining whether to continue obtaining set of streaming nodes and corresponding data, deriving correlated data, and providing message data streams for as long as there is new corresponding data in the streaming node of the set of streaming nodes.

In some embodiments, the consuming client subscribes to message data streams and is provided with new message data streams when new corresponding data is available in the streaming node of the set of streaming nodes.

In some embodiments, the set of streaming nodes comprises a sub-graph of a graph structure.

In some embodiments, the graph structure is a graph database.

In some embodiments, derivation of correlated data comprises copying message data or referencing individual—or ranges of—message data for later look-up.

In some embodiments, the controller is further configured to cause notification to the consuming client that the requested message data streams are available for provision.

In some embodiments, the controller is further configured to cause generation of a request identifier for the received request, and provision of the generated request identifier to the consuming client for identification of the requested message data streams when provided to the consuming client.

In some embodiments, the controller is further configured to cause reception of a plurality of requests from a plurality of consuming clients and provision of corresponding message data streams and wherein each of the plurality of requests and the corresponding message data streams are identifiable by the per request generated request identifier.

In some embodiments, the routing component comprises a plurality of sub-components each acting as a separate routing component.

In some embodiments, the routing component is a message broker.

In some embodiments, the message data comprises any one of: provenance information, sensor readings, actuations, log statements, events, commands, and communication messages.

In some embodiments, the set of streaming nodes and interconnections comprise any one of: provenance, absolute or relative location, names, identities, and classes.

In some embodiments, the data streams provided to the consuming client over the network interface relate to any one of: industrial robotics, sensors in a building, and production machines.

A fourth aspect is a routing component comprising the arrangement according to the third aspect.

A fifth aspect is a system comprising the arrangement according to the third aspect and/or the routing component according to the fourth aspect.

In some embodiments, the system further comprises at least one consuming client, and a database.

An advantage of some embodiments is that alternative approaches for providing data streams to a consuming client over a network interface are provided.

Another advantage of some embodiments is that simple and efficient routing components may be provided for processing individual topics of data streams as relationships and data are provided by streaming nodes.

Yet an advantage of some embodiments is that queries for generating the data streams may be constructed more easily.

Any of the above aspects may additionally have features identical with or corresponding to any of the various features as explained above for any of the other aspects.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, data is more and more consumed via streaming and/or in real-time to allow processing as soon as possible to derive e.g. knowledge and such data may be arranged in streams which may each have multiple producers and/or consumers of individual topics.

Streaming data may be handled by routing components, e.g. message brokers, configured to separate the concerns of producers and consumers and allow individual messages to be handled, e.g. by joining of a stream and a table or another stream or producing a table from a stream, in the routing component.

A graph databases is a database comprising a graph structure for semantic queries with nodes, edges, i.e. interconnections between nodes, and properties to represent and store data. Streaming sub-graph data is used to stream node-edge-node pairs or similar structures to maintain or process a sub-graph and wherein it is possible to "walk" a sub-graph and subscribe to each step (node-edge-node) as a message or the other way around producing steps as messages to iteratively build up a sub-graph.

In the following, embodiments will be presented where alternative approaches for providing data streams to a client over a network interface are described.

Figure 1:
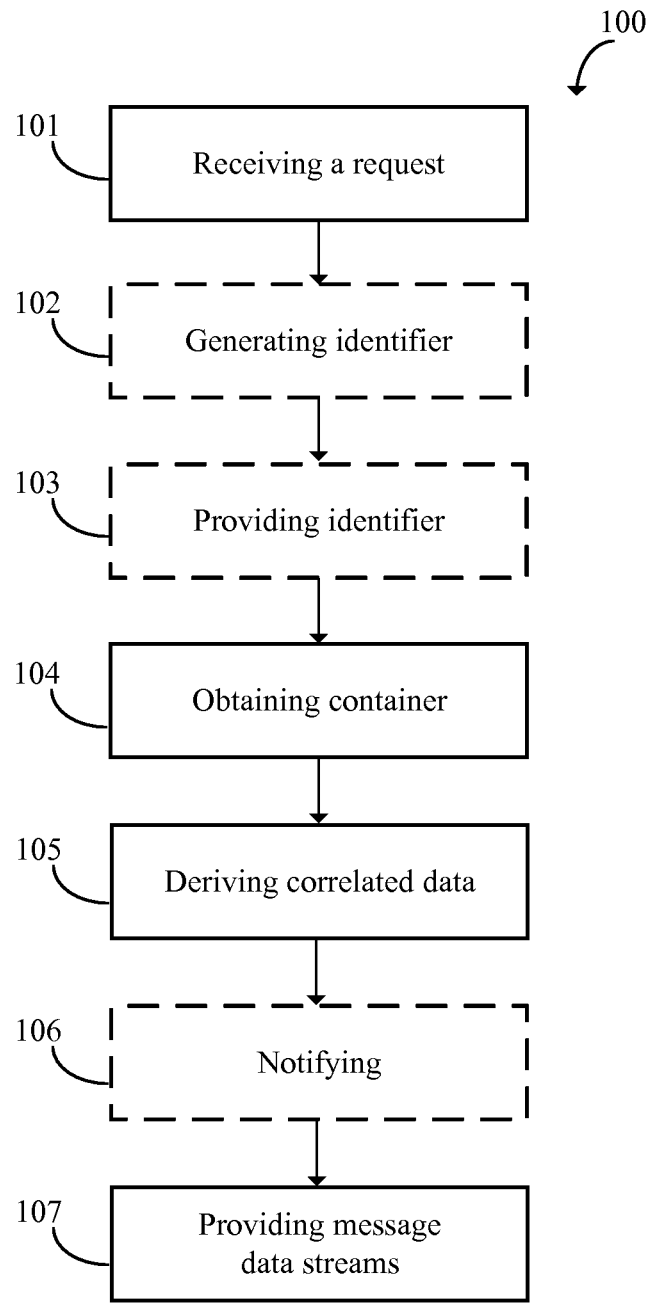
FIG. 1 is a flowchart illustrating example method steps according to some embodiments.

FIG. 1 is a flowchart illustrating method steps of an example data provisioning method 100 according to some embodiments. The data provisioning method 100 is for providing data streams to a consuming client over a network interface wherein the data streams comprise message data streams based on streaming nodes indicative of message topics configured for storing and streaming message data, wherein each of the streaming nodes represents a data source device, and wherein interconnections between the streaming nodes define relationships between the streaming nodes. Thus, the data provisioning method 100 may, for example, be performed by the arrangement 400 of FIG. 4 and/or the computer program product 500 of FIG. 5; both of which will be described later herein.

The data provisioning method 100 comprises the following steps being performed by a routing component.

In step 101, a submitted request from a consuming client comprising a query for a set of streaming nodes and corresponding data is received, wherein each streaming node of the set of streaming nodes is associated with each other via one or more interconnections in the set of streaming nodes.

Alternatively or additionally, the submitted request may in addition to the query comprise information about the consuming client submitting the request for identification purposes.

In some embodiments, the query is indicative of one or more message data identifiers for messages, or segments of messages in a time-series of messages, for which data streams should be provided.

In some embodiments, the query is further indicative of a time interval criterion for identifying a time interval for which the message data streams should be provided.

In some embodiments, the query is further indicative of a continuation criterion for determining whether to continue obtaining set of streaming nodes and corresponding data, deriving correlated data, and providing message data streams for as long as there is new corresponding data in the streaming node of the set of streaming nodes.

In optional step 102, in some embodiments, a request identifier is generated for the received request.

For example, the routing component may generate an identifier, e.g. a job identity event, and build a table with all job identities, streaming nodes and corresponding data.

In optional step 103, in some embodiments, the generated request identifier is provided to the consuming client for identification of the requested message data streams when provided to the consuming client.

In some embodiments, the method comprises receiving a plurality of requests from a plurality of consuming clients and providing corresponding message data streams and wherein each of the plurality of requests and the corresponding message data streams are identifiable by the per request generated request identifier.

In step 104, a container comprising the set of streaming nodes and corresponding data from a database based on the query of the received request is obtained, wherein the corresponding data comprises at least one message stored in a streaming node of the set of streaming nodes.

Alternatively or additionally, obtaining the container may comprise receiving or retrieving the container.

The container may therefore enable obtaining, for example retrieving or receiving, of a set of streaming nodes and corresponding data from the database.

The streaming nodes may accordingly provide streaming messages i.e. messages of streaming nature. Hence, the streaming nodes may be considered to comprise "live" objects of streaming nature.

The database may comprise one or more message sources comprising the corresponding data for the set of streaming nodes.

Alternatively or additionally, the container may comprise references to the set of streaming nodes and corresponding data from the database.

For example, retrieving a collection of streaming nodes may comprise a literal collection of streaming nodes, or an identifier referencing a set (e.g. collection) of streaming nodes.

For example, retrieving a collection of streaming nodes may comprise a query, or an identifier referencing a query, evaluating to a set (e.g. collection) of streaming nodes.

For example, retrieving corresponding data from the database (e.g. a message source) may comprise a literal collection of message streams, or an identifier referencing a collection of message streams.

For example, retrieving corresponding data from the database (e.g. a message source) may comprise a function mapping a streaming node, or an identifier referencing a streaming node, to a message stream, a sequence of messages, a message iterator, or an identifier referencing a message stream, a sequence of messages, or a message iterator.

In some embodiments, the at least one message comprises a time-series of messages stored in one streaming node of the set of streaming nodes or a plurality of time-series messages stored in a plurality of streaming nodes of the set of streaming nodes.

In some embodiments, the message topics for the message data streams are selected based on interconnection attributes.

In step 105, correlated data is derived based on the obtained container.

In some embodiments, deriving correlated data comprises copying message data or referencing individual or ranges of message data for later look-up.

For example, correlated data is derived based on the set of streaming nodes and corresponding data.

Alternatively or additionally, deriving correlated data for a set (e.g. collection) of streaming nodes from one or more databases (e.g. message sources) entails one or more of fetching a message or a reference to a message from a sequence or a stream, or evaluating an iterator for a message or a reference to a message.

In optional step 106, in some embodiments, the consuming client is notified that the requested message data streams are available for provision.

For example, the routing component may publish such information in a data message on an agreed-on data stream topic or as a streamed Hypertext Transfer Protocol (HTTP) response, etc.

In step 107, the set of streaming nodes and the derived correlated data is provided to the consuming client in message data streams.

In some embodiments, steps 104, 105, and 107 are repeated so that data streams are provided to the consuming client.

In some embodiments, the consuming client subscribes to message data streams and is provided with new message data streams when new corresponding data is available in the streaming node of the set of streaming nodes.

For example, the consuming client may comprise a client who consumes, i.e. by requesting and receiving, data for further processing in e.g. streaming or real-time.

In some embodiments, the set of streaming nodes comprises a sub-graph of a graph structure.

In some embodiments, the graph structure is a graph database.

In some embodiments, the routing component comprises a plurality of sub-components each acting as a separate routing component.

In some embodiments, the routing component is a message broker.

In some embodiments, the message data comprises any one of provenance information, sensor readings, actuations, log statements, events, commands, and communication messages.

In some embodiments, the set of streaming nodes and interconnections comprise any one of provenance, absolute or relative location, names, identities, and classes.

In some embodiments, the data streams provided to the consuming client over the network interface relate to any one of industrial robotics, sensors in a building, and production machines.

Hence, in view of above method steps, provision of data streams based on streaming nodes is enabled.

An advantage of some embodiments is that alternative approaches for providing data streams to a consuming client over a network interface are provided.

Another advantage of some embodiments is that simple and efficient routing components may be provided for processing individual topics of data streams as relationships and data are provided by streaming nodes.

Yet an advantage of some embodiments is that queries for generating the data streams may be constructed more easily.

Figure 2:
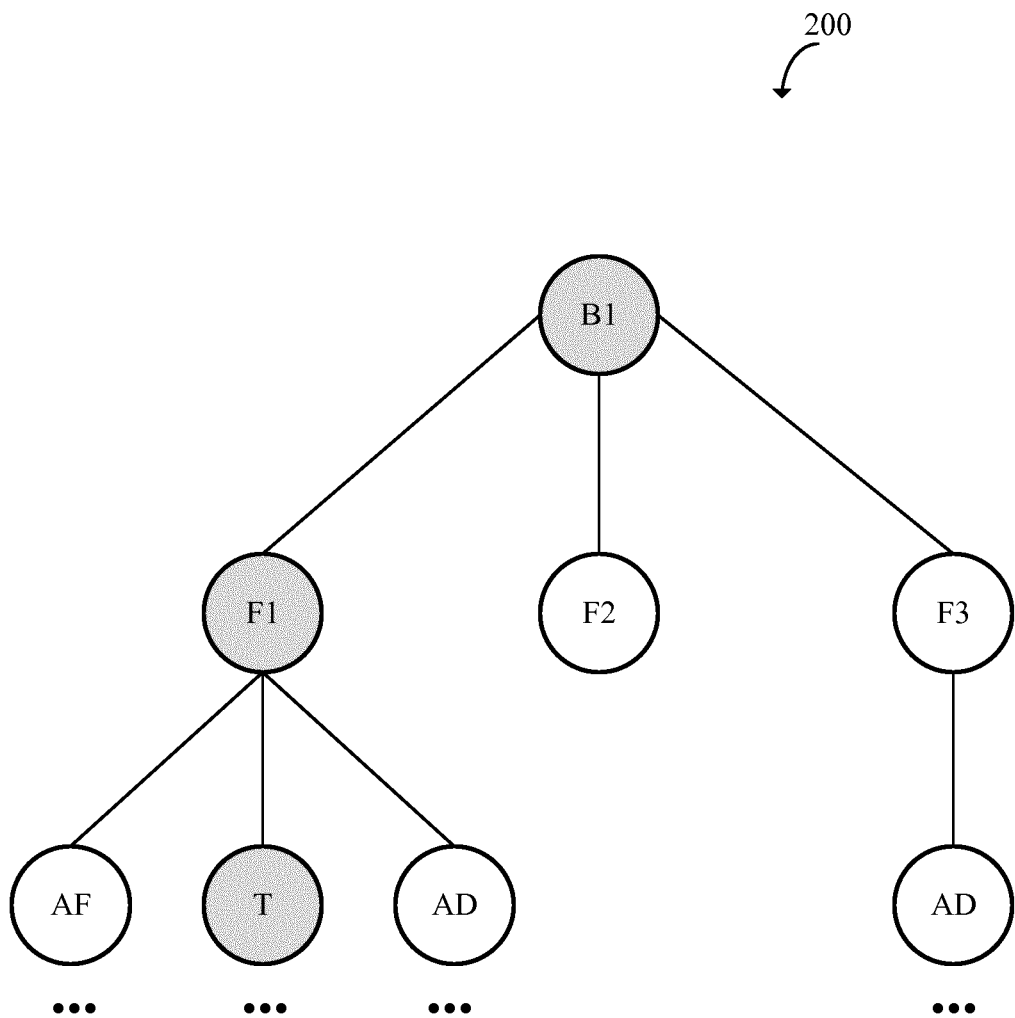
FIG. 2 is a schematic drawing illustrating example nodes and interconnections of an example structure according to some embodiments.

FIG. 2 is a schematic diagram illustrating nodes and interconnections of an example data provisioning structure 200 according to some embodiments. The nodes and interconnections, and the example data provisioning structure 200 are for providing data streams to a consuming client over a network interface wherein the data streams comprise message data streams based on streaming nodes indicative of message topics configured for storing and streaming message data, wherein each of the streaming nodes represents a data source device, and wherein interconnections between the streaming nodes define relationships between the streaming nodes. Thus, the data provisioning structure 200 may, for example, be comprised in a system comprising the arrangement 400 of FIG. 4 and/or the computer program product 500 of FIG. 5; both of which will be described later herein.

The data provisioning structure 200 may comprise a sub-graph of a graph structure wherein the graph structure is a graph database.

A consuming client may request a sub-graph e.g. B1/F1/T, i.e. Building 1/Floor 1/Temperature, with data from multiple topics based on interconnection attributes, i.e. edge information. This allows the routing component to order, synchronize, combine and filter data messages based on the request and provide a stream of data messages which may constitutes a sub-graph. This is useful for data that is streaming and have multiple relations towards other topics. Some graph nodes, i.e. streaming nodes, may contain an (endless) time series of data, which may be stored as a stream of messages instead of an expanding mutable graph node state or an artificial edge between consecutive messages.

Message topics and edge relationships, i.e. interconnections, are first class constructs used to define sub-graphs in graph structures. That is, in addition to defining message topics (graph nodes or streaming nodes), edge relationships (graph edges or relationships) are also defined between such message topics as well as further edges between individual messages, and thus defining sub-graphs in graph structures. Even though topic-level edges are declared on a topic-level, it will imply relations between messages, it is just that the relation kind is not changing between consecutive messages. Thereby, dynamic additions or changes to the topic relations are handled, which allows for a client subscription to dynamically start traversing edges to topics.

Topic-level edge types may have these properties:
key-value pairs for attributes,
relation kind declarations—
  either pre-defined or user-defined methods, typically metadata-based and common message encodings are pre-defined but allow other user-defined methods to implement arbitrary message encodings:
    time-stamp based matching between metadata on messages,
    identity/labeling/tagging based matching between metadata on messages or a literal value,
    order, either absolute or relational (e.g. last message) of messages,
    time-window based, either absolute or relational time matched for message time-stamps,
    message value field based match between messages or a literal value,
    explicit message-level relation reference for a message, or a combination of these.

Message-level edge types (not only sub-set of topic-level edges instead message-level edges can be in addition to topic-level edges e.g. two topics may be related to sensors of a same floor (i.e. an edge between them), while specific messages between one topic and the other can be related by an edge citing a different message-level relationship) may have these properties:
key-value pairs for attributes,
explicit identifying a specific message on another topic, typically provided by the same producer client in the same request.

A topic may have many potential edges towards other topics, but per-message only a sub-set of those edges may actually be present. Such edge properties could also be declared to improve performance, e.g. to declare all, one, or few edges in a group will be active.

The system may act as a routing component (e.g. message broker service (server)) for such sub-graphs in graph structures. Clients can interact with such a system through Application Programming Interfaces (API) or client Software Development Kits (SDK).

Such a routing component (e.g. message broker) comprises of one or more individual routing components (e.g. message brokers) collectively offering the routing cluster (e.g. broker cluster), functioning in a typical master-slave configuration, or a more advanced multi-master configuration.

Interfaces: clients can interact with the routing component in the following manner:

Admin clients can define sub-graphs in graph structures, message topics (nodes) and edge relationships as described above. Producer clients can describe such message-level relations. For some instances the producer and admin clients may be the same client.

Admin clients may request information on (partial) sub-graphs in graph structures that satisfy specific edge relationship attributes, to explore the graph structure, i.e. not the data.

Producer clients may publish messages to topics, optionally with additional message-level edge relationships and properties.

Consuming clients may subscribe to streaming messages on a sub-graph in graph structure of topics.

such sub-graph can be expressed with common graph query expressions like:
  Naming of topics,
  Follow an edge with a key, or set of keys,
  Follow an edge with a key value pair or value ranges,
  Follow all edges,
    These can also be combined in chains. For example, first follow all edges and then on next node only follow a certain key, and hence limiting the first edge following to nodes with other edge having that key.
  The consumer can also select to retrieve only some of the graph nodes in a chain, e.g. to skip intermediary nodes.
  Consuming clients will get a response in a stream of messages, this may be encoded in several different ways:
    An actual sub-graph in a graph structure with nodes and edges (including attributes),
    A record of combined data from individual topics,
    A tuple with the data.

In the following, implementations of embodiments will be presented where alternative approaches for providing data streams to a client over a network interface are described.

1. Utilizing a Graph Database and a Front-End Service:
  A front-end service creates message topics (graph nodes) as meta-nodes, with edge relationships defined between them. Such nodes and edges and their properties may be defined in a typical graph database model. Incoming individual (consecutive) messages in a topic are created as graph nodes too, with edges between them defining relationships such as order between them (if defined) and towards their topic meta-node. The front-end service would also produce further edges towards messages in other topics (meta-nodes) during insertion into the graph database. Alternatively or additionally, the message payload is stored separately from the graph, and just store their references as vertices along with edges in the graph model. If expecting large amounts of time-series data on topics this would produce a large graph with each message as a new node but would have a fast access for consumers as long as the graph database could handle the amount of data efficiently. For consuming clients the front-end service would need to monitor new nodes and evaluate if any new consumer messages needs to be sent out.

2. Utilizing Routing Components and a Front-End Service:
  A front-end service or/and a client library can encode edge relations for incoming message into the metadata of a message. The front-end service also keeps a (graph) database with the references to topics and the declared edges between them. Handling admin and storing produced messages on topics would be swift in this setup but would have a reduced performance for retrieving messages to serve clients efficiently, since it is non-trivial to search for messages on topics and traverse a requested graph. Producer and Consumer client information like which topics and partial graphs to produce/consume may be handled by the front-end service but delegated the per-topic client handling to a conventional broker.

If instead using an advanced routing component, the searching would be more efficient but still would require substantial effort to traverse a graph with large edge fan-out.

3. A Modified Graph Database:
  Graph-nodes handling additive collection of data, typically referred to as time-series data.
  This would then allow for a reduced storage and processing overhead for each data message compared to 1), due to no edges between consecutive elements and towards a meta-node. Utilize time-series database methods for storing data elements, like journaling/logging based, which is efficient for adding new data at the end.

Each message still would have edges towards messages in other topics, but the potential edges are limited by the declaration of edges between topics. Which limits the information needed to be stored per message to basically an index among potential edges.

Processing passes over the data and edge information would produce an offset into a time-series on another node for each declared edge to quickly traverse graphs.

Streaming response to consumer clients:

Since the query is expected to return a stream of messages, for each message only the part of the queried graph that has been updated needs to be evaluated. Previous traversals may be cached to speed up traversals.

Hence, in view of above, provision of data streams based on streaming nodes is enabled.

Figure 3A:
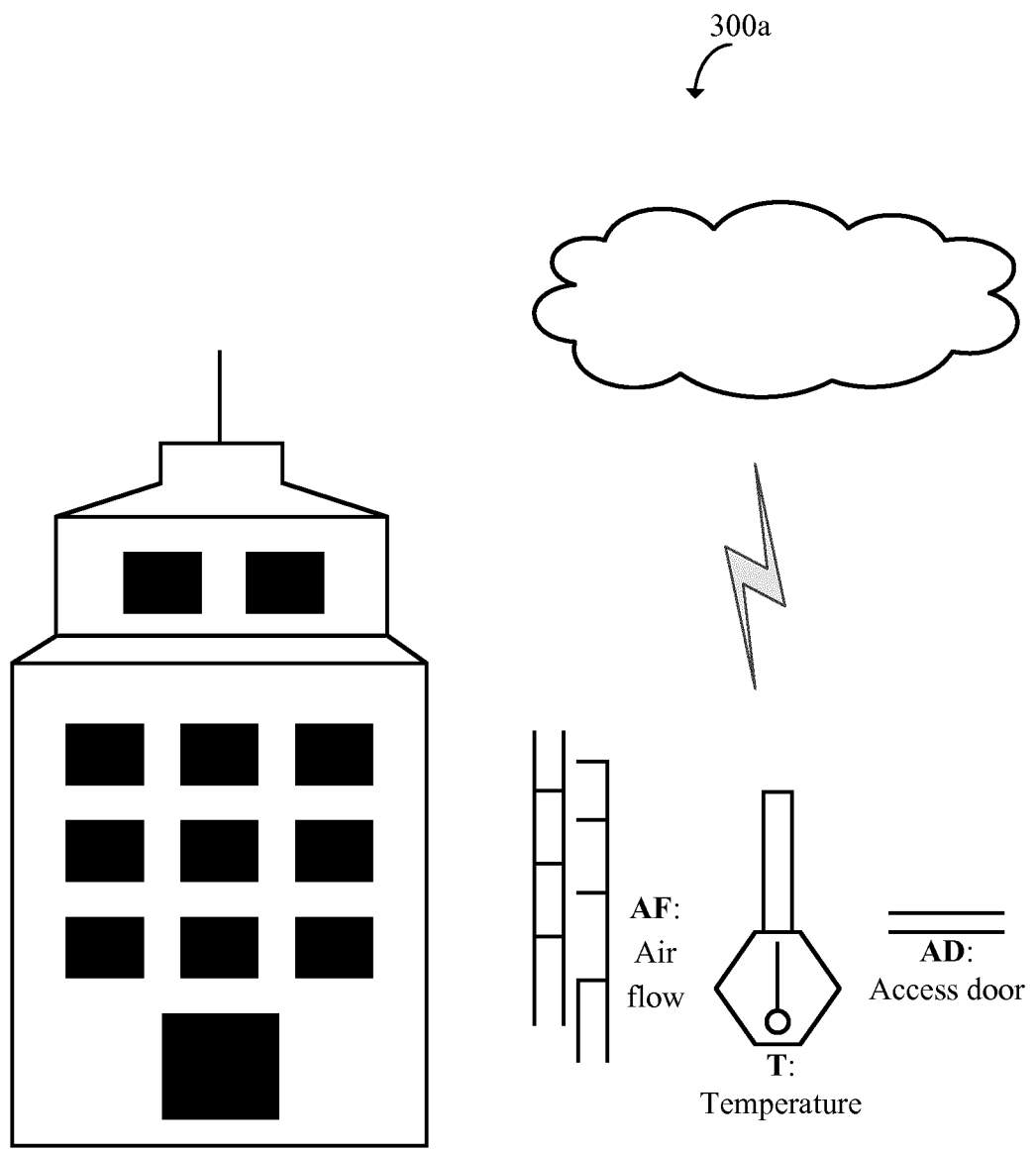
FIG. 3a is a schematic drawing illustrating example sensors of an example environment according to some embodiments.

FIG. 3a is a schematic drawing illustrating sensors of an example data provisioning environment 300a according to some embodiments. The sensors and the example data provisioning environment 300a are for providing data streams to a consuming client over a network interface wherein the data streams comprise message data streams based on streaming nodes indicative of message topics configured for storing and streaming message data, wherein each of the streaming nodes represents a data source device, and wherein interconnections between the streaming nodes define relationships between the streaming nodes. Thus, the data provisioning environment 300a may, for example, be comprised in a system comprising the arrangement 400 of FIG. 4 and/or the computer program product 500 of FIG. 5; both of which will be described later herein.

Figure 4:
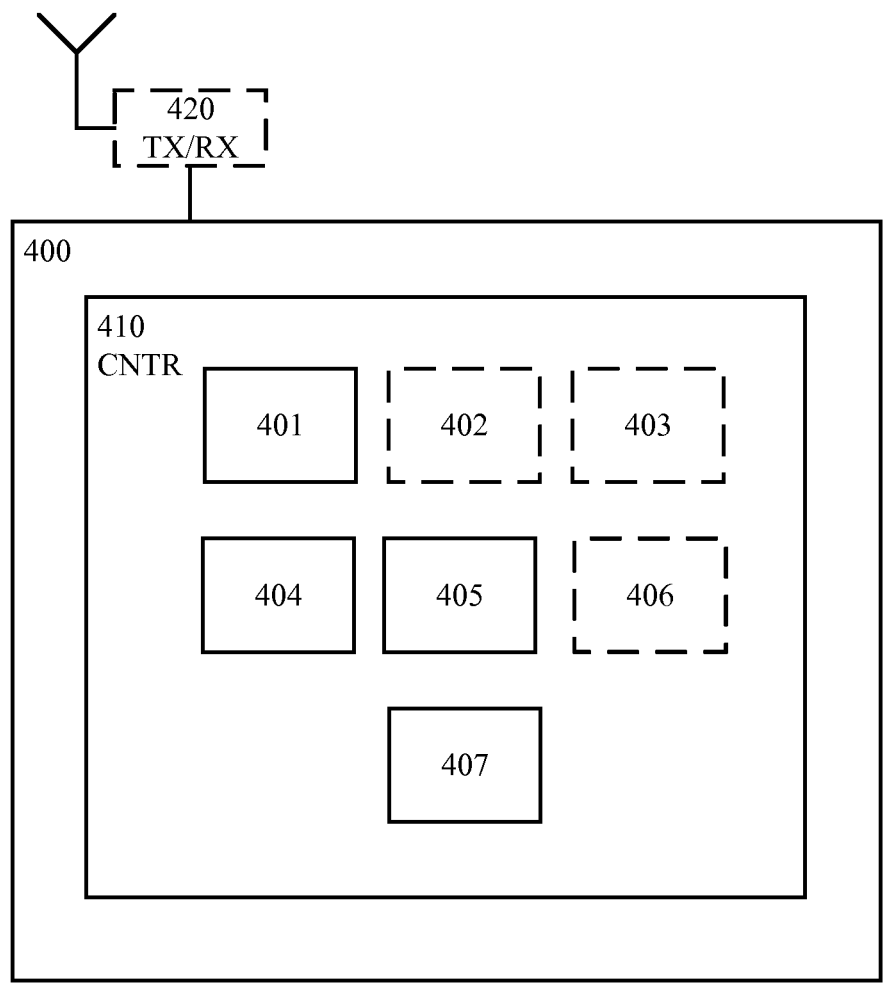
FIG. 4 is a schematic block diagram illustrating an example arrangement according to some embodiments.

Alternatively or additionally, the system may comprise a routing component and/or the arrangement 400 of FIG. 4.

For example, the routing component may comprise the arrangement 400 of FIG. 4.

The system may, in some embodiments, further comprise at least one consuming client, and a database.

FIG. 3a illustrates a building comprising at least one sensor. The at least one sensor may comprise any one of a sensor for air flow AF, a sensor for temperature T, and a sensor for door accesses AD. The at least one sensor is configured to collect and store data according to the purpose of the sensor and communicate wirelessly with a cloud service for storing collected data. The collected and stored data comprises message data for storage in one or more streaming nodes.

In some embodiments, the set of streaming nodes comprises a sub-graph of a graph structure.

In some embodiments, the graph structure is a graph database.

Hence, as provision of data streams may be based on streaming nodes comprised in a sub-graph of a graph structure stored in e.g. a distributed system e.g. in a cloud service, there is no need for the routing component to comprise message data nor interconnections and a more efficient routing component is provided.

For example, the building may comprise at least one sensor per floor, e.g. Building/Floor/Sensor, or per floor per room, e.g. Building/Floor/Room/Sensor. Hence, a topic identifier may identify a certain type of data (air flow, temperature, door accesses) for a certain location (room or floor) in the building, e.g. Temperature for a particular room in the Building, from one sensor or a plurality of sensors configured to collect the certain type of data arranged in the certain location based on streaming nodes and/or interconnections, wherein the streaming nodes may comprise any one of Building, Floor, Room, Sensor and interconnections comprise any relationship between the streaming nodes.

Hence, in view of above, provision of data streams based on streaming nodes is enabled.

Figure 3B:
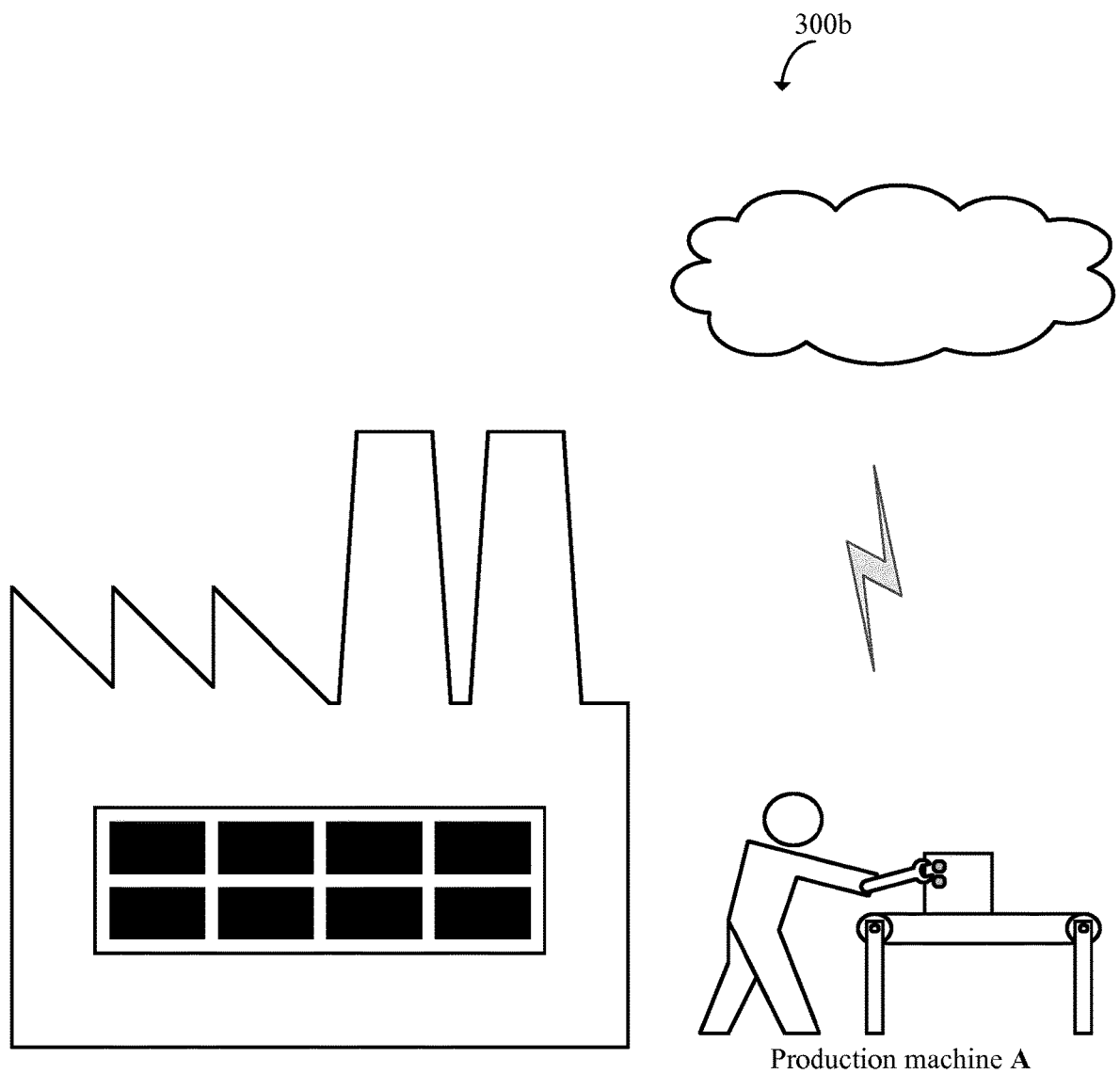
FIG. 3b is a schematic drawing illustrating example sensors of an example environment according to some embodiments.

FIG. 3b is a schematic drawing illustrating sensors of an example data provisioning environment 300b according to some embodiments. The sensors and the example data provisioning environment 300b are for providing data streams to a consuming client over a network interface wherein the data streams comprise message data streams based on streaming nodes indicative of message topics configured for storing and streaming message data, wherein each of the streaming nodes represents a data source device, and wherein interconnections between the streaming nodes define relationships between the streaming nodes. Thus, the data provisioning environment 300b may, for example, be comprised in a system comprising the arrangement 400 of FIG. 4 and/or the computer program product 500 of FIG. 5; both of which will be described later herein.

Alternatively or additionally, the system may comprise a routing component and/or the arrangement 400 of FIG. 4.

For example, the routing component may comprise the arrangement 400 of FIG. 4.

The system may, in some embodiments, further comprise at least one consuming client, and a database.

FIG. 3b illustrates a factory (or industrial plant) comprising at least one sensor arranged on machines and/or equipment e.g. production machine A. The at least one sensor may comprise any one of a sensor for indicating status of machinery, a sensor for internal temperature of machinery, a pressure sensor, a proximity sensor, an optical sensor, and a position sensor. The at least one sensor is configured to collect and store data according to the purpose of the sensor and communicate wirelessly with a cloud service for storing collected data. The collected and stored data comprises message data for storage in one or more streaming nodes.

In some embodiments, the set of streaming nodes comprises a sub-graph of a graph structure.

In some embodiments, the graph structure is a graph database.

Hence, as provision of data streams may be based on streaming nodes comprised in a sub-graph of a graph structure stored in e.g. a distributed system e.g. in a cloud service, there is no need for the routing component to comprise message data nor interconnections and a more efficient routing component is provided.

For example, the factory may comprise at least one sensor per machine per area, e.g. Factory/Area/Machine/Sensor, or per machine part per machine per area, e.g. Factory/Area/Machine/Part/Sensor. Hence, a topic identifier may identify a certain type of data (status, internal temperature etc.) for a certain machine in a certain area (production area) in the factory, e.g. Status for Machine A in a particular area in the Factory, from one sensor or a plurality of sensors configured to collect the certain type of data arranged on the certain machine based on streaming nodes and/or interconnections, wherein the streaming nodes may comprise any one of Factory, Area, Machine, Part, Sensor and interconnections comprise any relationship between the provenance entities.

For example, a request would be for a consuming client to request all products that were produced during machine fault. If part of the sub-graph of the graph structure is built from product⇔item⇔tooling-machine⇔<tooling-machine-sensor-data>⇔fault-detector. Each node having a stream of messages and the ⇔ being an edge (interconnection) structuring the graph knowledge of the information. The consumer client would subscribe for all messages from the fault-detector with the graph (specified by e.g. edge attributes to follow) that leads to the product. In the above the <tooling-machine-sensor-data> is any of numerous topics that leads to the product, and the consumer client select that graph node topic based on edge attributes and not the specific topic. Hence, unnecessary joins and filtering of data streams are avoided.

Hence, in view of above, provision of data streams based on streaming nodes is enabled.

FIG. 4 is a schematic block diagram illustrating an example data provisioning arrangement 400 according to some embodiments. The data provisioning arrangement 400 is for a routing component, wherein the routing component is configured for providing data streams to a consuming client over a network interface wherein the data streams comprise message data streams based on streaming nodes indicative of message topics configured for storing and streaming message data, wherein each of the streaming nodes represents a data source device, and wherein interconnections between the streaming nodes define relationships between the streaming nodes. Thus, the data provisioning arrangement 400 may, for example, be configured to perform one or more of the method steps of FIG. 1 or otherwise described herein.

The data provisioning arrangement 400 comprises a controller, e.g. device controlling circuitry, configured to cause reception, from a consuming client, of a request comprising a query for a set of streaming nodes and corresponding data, wherein each streaming node of the set of streaming nodes is associated with each other via one or more interconnections in the set of streaming nodes, and obtainment of a container comprising the set of streaming nodes and corresponding data from a database based on the query of the received request, wherein the corresponding data comprises at least one message stored in a streaming node of the set of streaming nodes.

The controller is further configured to cause derivation of correlated data based on the obtained container, and provision, to the consuming client, of the set of streaming nodes and the derived correlated data in message data streams.

The data provisioning arrangement 400 for a routing component comprises, as mentioned above, a controller (CNTR; e.g., control circuitry or a controlling module) 410, which may in turn comprise, (or be otherwise associated with; e.g., connected or connectable to), a receiving module 401, e.g. a receiver 401 (e.g. receiving circuitry or receiving module) configured to receive, from a consuming client, a request comprising a query for a set of streaming nodes and corresponding data, wherein each streaming node of the set of streaming nodes is associated with each other via one or more interconnections in the set of streaming nodes (compare with step 101 of FIG. 1), and an obtainer 404 (e.g. obtaining circuitry or obtaining module) configured to obtain a container comprising the set of streaming nodes and corresponding data from a database based on the query of the received request, wherein the corresponding data comprises at least one message stored in a streaming node of the set of streaming nodes (compare with step 104 of FIG. 1).

The CNTR 410 further comprises, (or is otherwise associated with; e.g., connected or connectable to), a deriver 405 (e.g. deriving circuitry) configured to derive correlated data based on the obtained container (compare with step 105 of FIG. 1), and a provider 407 (e.g. providing circuitry or providing module) configured to provide, to the consuming client, the set of streaming nodes and the derived correlated data in message data streams (compare with step 107 of FIG. 1).

In some embodiments, the CNTR 410 further comprises, (or is otherwise associated with; e.g., connected or connectable to), a generator 402 (e.g. generating circuitry or generating module) configured to generate a request identifier for the received request (compare with step 102 of FIG. 1), and a provider 403 (e.g. providing circuitry or providing module) configured to provide the generated request identifier to the consuming client for identification of the requested message data streams when provided to the consuming client (compare with step 103 of FIG. 1).

The arrangement 400 may further comprise, (or be otherwise associated with; e.g., connected or connectable to), in some embodiments, a transceiving module TX/RX 420, e.g. transceiving circuitry, configured to transmit and receive radio signals e.g. for receiving from a consuming client a request comprising a query for a set of streaming nodes and corresponding data and/or for providing to the consuming client the set of streaming nodes and the derived correlated data in message data streams Hence, in view of above arrangement, provision of data streams based on streaming nodes is enabled.

An advantage of some embodiments is that alternative approaches for providing data streams to a consuming client over a network interface are provided.

Another advantage of some embodiments is that simple and efficient routing components may be provided for processing individual topics of data streams as relationships and data are provided by streaming nodes.

Yet an advantage of some embodiments is that queries for generating the data streams may be constructed more easily.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device.

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

According to some embodiments, a computer program product comprises a computer readable medium such as, for example a universal serial bus (USB) memory, a plug-in card, an embedded drive or a read only memory (ROM).

Figure 5:
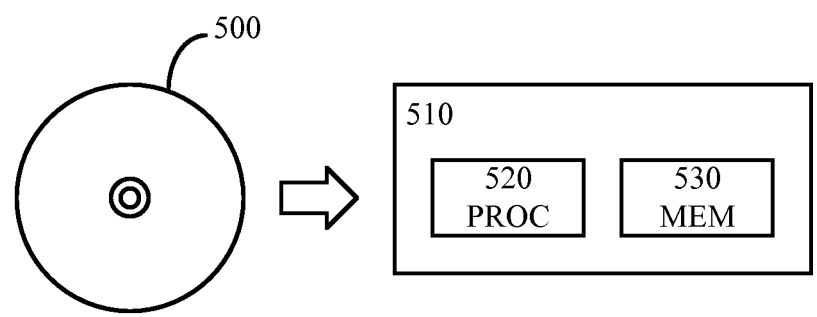
FIG. 5 is a schematic drawing illustrating an example computer readable medium according to some embodiments.

FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a wireless communication device 510. When loaded into the data processing unit, the computer program may be stored in a memory (MEM) 530 associated with or comprised in the data-processing unit.

In some embodiments, the computer program may, when loaded into and run by the data processing unit, cause execution of method steps according to, for example, FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for providing data streams to a consuming client over a network interface wherein the data streams comprise message data streams based on streaming nodes indicative of message topics configured for storing and streaming message data, wherein each of the streaming nodes represents a data source device, and wherein interconnections between the streaming nodes define relationships between the streaming nodes, the method comprising the following steps being performed by a routing component:

receiving, from a consuming client, a request comprising a query for a set of streaming nodes and corresponding data, wherein each streaming node of the set of streaming nodes is associated with each other via one or more interconnections in the set of streaming nodes, wherein the query is indicative of message data identifiers for messages, or segments of messages in a time-series of messages, for which data streams should be provided, in response to the receiving of the request, obtaining a container comprising the set of streaming nodes and corresponding data from a database based on the query of the received request, wherein the corresponding data comprises at least one message stored in a streaming node of the set of streaming nodes, wherein obtaining the container is in response to evaluating the set of streaming nodes, wherein obtaining the container comprises a function mapping the streaming node to a message iterator associated with the corresponding data, the message iterator indicating a sequence of messages to be provided to the consuming client, wherein the at least one message comprises a time-series of messages stored in one streaming node of the set of streaming nodes or a plurality of time-series messages stored in a plurality of streaming nodes of the set of streaming nodes, deriving correlated data based on the obtained container, and providing, to the consuming client, the set of streaming nodes and the derived correlated data in message data streams, wherein the message topics for the message data streams are selected based on interconnection attributes, wherein the interconnection attributes comprise edge information associated with the set of streaming nodes, wherein the message data streams are encoded with key-value pairs associated with the interconnection attributes, wherein a first key-value pair indicates relations between the set of streaming nodes and the corresponding data.

2. An arrangement for a routing component, wherein the routing component is configured for providing data streams to a consuming client over a network interface wherein the data streams comprise message data streams based on streaming nodes indicative of message topics configured for storing and streaming message data, wherein each of the streaming nodes represents a data source device, and wherein interconnections between the streaming nodes define relationships between the streaming nodes, the arrangement comprising a controller comprising a hardware processor configured to cause:

reception, from a consuming client, of a request comprising a query for a set of streaming nodes and corresponding data, wherein each streaming node of the set of streaming nodes is associated with each other via one or more interconnections in the set of streaming nodes, wherein the query is indicative of message data identifiers for messages, or segments of messages in a time-series of messages, for which data streams should be provided, in response to the reception of the request, obtainment of a container comprising the set of streaming nodes and corresponding data from a database based on the query of the received request, wherein the corresponding data comprises at least one message stored in a streaming node of the set of streaming nodes, wherein the message topics for the message data streams are selected based on interconnection attributes, wherein the interconnection attributes comprise edge information associated with the set of streaming nodes, wherein the obtainment of the container is in response to evaluating the set of streaming nodes, wherein the obtainment of the container comprises a function mapping the streaming node to a message iterator associated with the corresponding data, the message iterator indicating a sequence of messages to be provided to the consuming client, wherein the at least one message comprises a time-series of messages stored in one streaming node of the set of streaming nodes or a plurality of time-series messages stored in a plurality of streaming nodes of the set of streaming nodes, derivation of correlated data based on the obtained container, and provision, to the consuming client, of the set of streaming nodes and the derived correlated data in message data streams, wherein the message data streams are encoded with key-value pairs associated with the interconnection attributes, wherein a first key-value pair indicates relations between the set of streaming nodes and the corresponding data.

3. The arrangement according to claim 2, wherein the hardware processor is further configured to cause repetition of the obtainment of the container, the derivation of the correlated data, and the provision of the set of streaming nodes and the derived correlated data so that data streams are provided to the consuming client.

4. The arrangement according to claim 2, wherein the query is further indicative of a time interval criterion for identifying a time interval for which the message data streams should be provided.

5. The arrangement according to claim 2, wherein the query is further indicative of a continuation criterion for determining whether to continue obtaining set of streaming nodes and corresponding data, deriving correlated data, and providing message data streams for as long as there is new corresponding data in the streaming node of the set of streaming nodes.

6. The arrangement according to claim 2, wherein the consuming client subscribes to message data streams and is provided with new message data streams when new corresponding data is available in the streaming node of the set of streaming nodes.

7. The arrangement according to claim 2, wherein the set of streaming nodes comprises a sub-graph of a graph structure.

8. The arrangement according to claim 7, wherein the graph structure is a graph database.

9. The arrangement according to claim 2, wherein derivation of correlated data comprises copying message data or referencing individual or ranges of message data for later look-up.

10. The arrangement according to claim 9, wherein the routing component is a message broker.

11. The arrangement according to claim 2, wherein the hardware processor is further configured to cause:
notification to the consuming client that the requested message data streams are available for provision.

12. The arrangement according to claim 2, wherein the hardware processor is further configured to cause:
generation of a request identifier for the received request, and
provision of the generated request identifier to the consuming client for identification of the requested message data streams when provided to the consuming client.

13. The arrangement according to claim 2, wherein the hardware processor is further configured to cause reception of a plurality of requests from a plurality of consuming clients and provision of corresponding message data streams and wherein each of the plurality of requests and the corresponding message data streams are identifiable by the per request generated request identifier.

14. The arrangement according to claim 2, wherein the routing component comprises a plurality of sub-components each acting as a separate routing component.

15. The arrangement according to claim 2, wherein the message data comprises any one of: provenance information, sensor readings, actuations, log statements, events, commands, and communication messages.

16. The arrangement according to claim 2, wherein the set of streaming nodes and interconnections comprise any one of: provenance, absolute or relative location, names, identities, and classes.

17. The arrangement according to claim 2, wherein the data streams provided to the consuming client over the network interface relate to any one of: industrial robotics, sensors in a building, and production machines.

* * * * *